United States Patent [19]
Day

[11] 3,828,177
[45] Aug. 6, 1974

[54] ILLUMINATED FISH LURE

[76] Inventor: John R. Day, 39 Pigeon Hill St., Rockport, Mass. 01966

[22] Filed: May 16, 1973

[21] Appl. No.: 360,840

[52] U.S. Cl............................ 240/6.4 F, 43/17.6
[51] Int. Cl............................................ F21l 1/00
[58] Field of Search .............. 43/17.6, 17 S, 17.1; 240/1 LP:10 L, 6.4 R, 6.4 F

[56]      References Cited
         UNITED STATES PATENTS
1,982,609  11/1934  Freese.................................... 43/17.6
2,711,044   6/1955  Woods.................................... 43/17.6
2,740,220   4/1956  Caplan.................................... 43/17.6
3,431,410   3/1969  Dolan et al. ..................... 240/1 LP X
3,609,343   9/1971  Howlett.............................. 240/10 L
3,624,385  11/1971  Wall...................................... 240/10 L
3,721,033   3/1973  Haynes................................. 43/17.6

Primary Examiner—Louis G. Mancene
Assistant Examiner—Daniel J. Leach
Attorney, Agent, or Firm—Louis Orenbuch

[57]  ABSTRACT

An artificial fish lure having a watertight housing containing an electrical battery and a bulb which provide a source of illumination in the housing. A bundle of optical fibers extends into the housing and has its inner end close to the light source. The optical fibers conduct light out of the housing and the luminous outer ends of the fibers are spaced apart to give the aspect of a plurality of separated luminous spots. Various means can be employed to cause the luminous spots to be held in a desired pattern.

4 Claims, 6 Drawing Figures

ILLUMINATED FISH LURE

FIELD OF THE INVENTION

This invention relates in general to lures for attracting fish to hooks or nets. More particularly, the invention pertains to lures of the type having its own source of illumination.

DISCUSSION OF THE PRIOR ART

It is well known to skilled fishermen that fish are attracted by light movement and sound. Hence, artificial lures have been employed whose shape, color, and markings simulate the motion and appearance of live bait and some lures have even employed sound generators. The principal difficulty with artificial lures is the need for ambient light to make them visible to their prey. Consequently, artificial lures vary in effectiveness in dependence upon ambient light conditions and the clarity of the water. To avoid reliance upon the reflection of ambient light from the lure, self-illuminated fishing lures have been employed.

Prior art artificial fishing lures of the self-illuminated type generally employ a miniature light bulb and an electric battery to generate the illumination. To protect the battery and the bulb, those elements are usually enclosed in a watertight housing. To permit the light to emerge from the housing, the housing may be transparent or translucent. Where an opaque housing is used, it is provided with a window and may employ a lens to cause the light to emerge as a beam. Many of the prior art self-illuminated lures have a flashing light to simulate the normal changes in the reflectance of light that results when live bait moves through the water.

BRIEF DESCRIPTION OF THE INVENTION

The invention resides in a self-contained electrically powered fish lure having the aspect of a plurality of illuminated dots or specks. The illuminated dots are actually the light emitting ends of optical fibers which act as conduits for a light source housed inside the fish lure.

THE DRAWINGS

The invention, both as to its arrangement and mode of operation, can be better understood from the exposition which follows when it is considered in conjunction with the accompanying drawings in which.

EXPOSITION OF THE INVENTION

Figure 1:
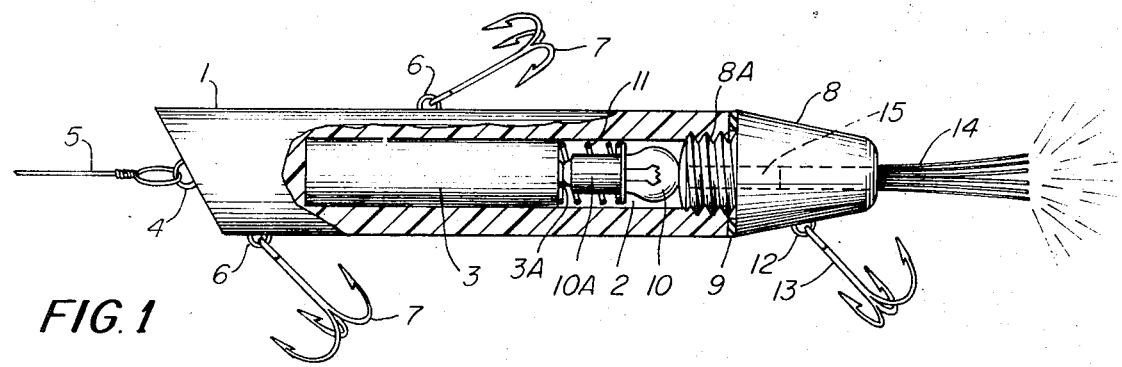
FIG. 1 is a view of the preferred embodiment of the invention in assembled form with part of the housing broken away to expose the interior arrangement.
Figure 2:
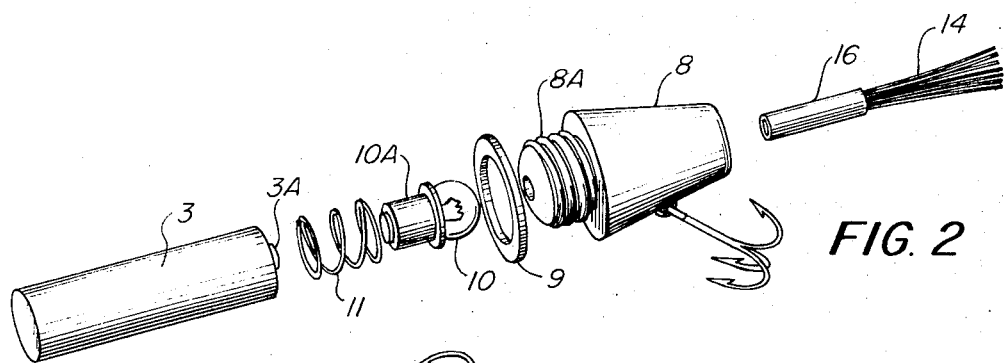
FIG. 2 is an exploded view of the embodiment depicted in FIG. 1.

Referring now to the assemblage shown in FIG. 1 and to the exploded view of FIG. 2, there is shown an embodiment of the invention employing an opaque cylindrical housing 1 having a central chamber 2 in which an electric battery 3 is received. The housing, at one end has an eyelet 4 to which a fishing line 5 can be attached, as indicated in the drawing. Other eyelets are provided, such as the eyelets 6, to which fishing hooks 7 are secured. A cap 8 is provided with a threaded nipple 8A to engage mating threads in the interior of the housing 1 whereby the open end of chamber 2 can be closed off by screwing the cap and housing together. A gasket 9 is disposed between the cap and the housing to make a watertight seal when the cap is tightened against the housing. Upon being tightened, the nipple of the cap bears against a light bulb 10 and forces the stem of the bulb upon the central electrode 3A of the battery against the force of a helical spring 11. The spring 11 is coiled around the brass ferrule 10A of the light bulb and one end of the spring is seated against the rim of the outer metallic casing of the battery.

When the cap is partially unscrewed, the helical spring raises the stem of the light bulb off the central electrode of the battery so that current cannot flow to the bulb because the circuit is incomplete. Tightening of the cap causes the nipple of the cap to press the stem of the bulb against the battery's control electrode. When the stem of the bubl sits upon the central electrode of the battery, the electrical circuit is closed and the battery energizes the light bulb to cause that bulb to emit light. The cap 8 is preferably opaque and may carry and eyelet 12 for the attachment of a hook 13, as depicted in FIG. 1.

To conduct light generated by bulb 10 to the outside of the housing, a bundle of optical fibers 14 is disposed in a channel 15 that passes centrally through the cap. For ease of fabrication of the lure, the inner end of the bundle of optical fibers is disposed in a brass tube 16. The tube is inserted in the central channel of the cap and is cemented or otherwise fixed to the cap. To prevent water from entering the housing through the spaces between the fibers of the fiber optics bundle, the interior of brass tube 14 is filled with a waterproof sealing material which closes the gaps between the fibers.

As is well known, each fiber of the "fiber optics" bundle acts as a light transmission conduit so that light entering one end of the fiber propagates along the conduit and emerges at the other end of the fiber substantially unattenuated. By shaping the light emergent end of the fiber as a lens, the emerging light can be formed into a beam. Alternatively, the light emergent end of the fiber can be shaped to promote scattering of the emerging light. Inasmuch as none or very little of the light escapes through the wall of the conduit, only the exposed end of each fiber is visibly illuminated. Thus, the bundle of fibers has the aspect of a plurality of illuminated dots when the light bulb is energized. The inner ends of the fibers of the bundle are in close proximity to the light bulb when the cap is fully tightened against the housing. The ends of the fibers, may even be arranged to rest directly upon the glass envelope of the bulb. The outer ends of the fibers in the bundle preferably are spread apart to give the appearance of a number of moving illuminated points as the lure is pulled through the water.

The housing can be made to be buoyant to float upon the water or can be made heavier so that it sinks below the surface. The weight of the lure can be adjusted by attaching "sinkers" to the lure or to the fishing line, in the manner common in the art of fishing.

Figure 3:
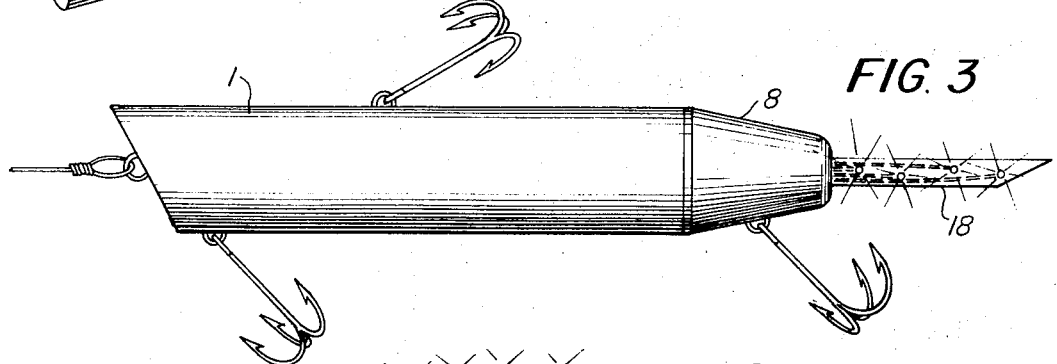
FIG. 3 shows a modification of the preferred embodiment having a translucent sleeve to contain the optical fibers which extend outside the housing.

The aspect presented by the illuminated ends of the fiber optics bundle can be altered to suit the occasion. For example, the fibers can be of different lengths, as illustrated in the embodiment of FIG. 3, to form a sequence of illuminated dots. To hold the fibers in line, a transparent sleeve 18 of a clear material, such as polyvinychloride, can be placed over the fibers and secured to the cap.

Figure 4:
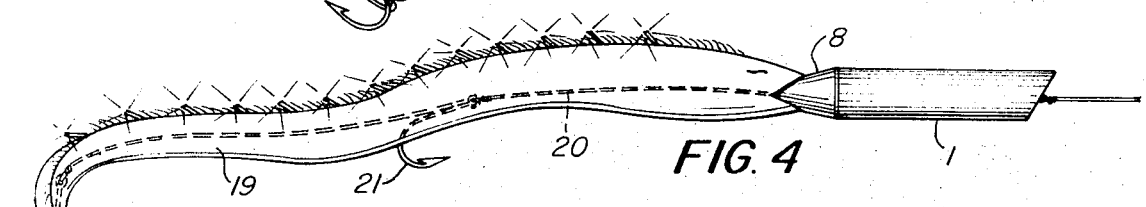
FIG. 4 depicts a modification of the preferred embodiment in which the light emitting ends of the optical fibers are spaced along the spine of a simulated elongated fish.

FIG. 4 depicts an embodiment of the invention which has the appearance of an eel or an elongated fish. The elongated fish is a length of flexible tubing 19 having holes spaced along its spine. The fibers of the bundle are of different lengths and each fiber is brought out through a hole in the tubing. Running through the tube is a line 20 to which hooks 21 and 22 are attached. The line is secured at one end to the cap 8. The coloration and appearance of the flexible tube can be made to simulate the appearance of live bait. Hooks extend through the flexible tube and are situated to engage a fish which swallows the lure. In lieu of employing a flexible tube, the optical fibers and the hook line can be embedded in a flexible "plastic" material which can be molded in the shape of the elongated fish. When pulled through the water, the lure gives the appearance of a live fish having a plurality of specular points along its spine.

Figure 5:
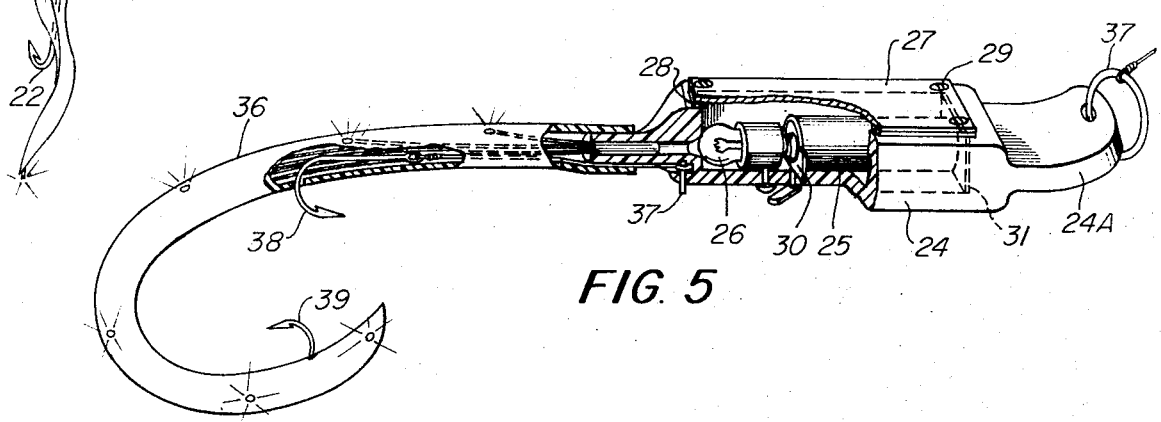
FIG. 5 shows an embodiment of the invention having an external switch for turning the source of illumination on or off.
Figure 5A:
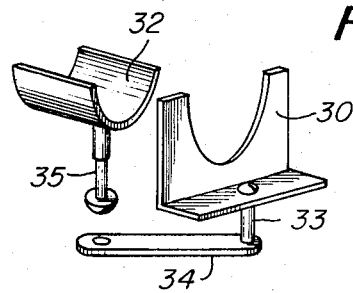
FIG. 5A shows details of the switch employed in the FIG. 5 embodiment.

FIG. 5 illustrates an embodiment of the invention employing a switch that can be operated from outside the housing to turn the light on or off. In the FIG. 5 embodiment, the housing 24 has a chamber which receives the battery 25 and the light bulb 26. The chamber is closed by a lid 27 which rests upon a gasket 28 that provides a watertight seal. At the corners of the lid, screws 29 are used to tighten the lid against the housing and the interposed gasket. An electrode 30 is disposed in the chamber where it engages the metal casing that acts as one electrode of the battery 25. A pad 31 of resilient material, such as rubber, in the housing urges the battery against the electrode 30 which can be simply a leaf spring. In lieu of resilient pad 31, a helical spring of the type commonly used in flashlights may be employed. Light bulb 26 has its stem resting upon an electrode 32 having the form of a semi-cylindrical cradle as depicted in FIG. 5A. The light bulb is supported in the cradle so that the central electrode of the bulb is maintained in alignment with the central electrode of the battery. The cradle electrode 32 provides electrical contact with the brass shell electrode on the stem of the bulb. Leaf spring 30 is held by a rivet 33 that extends through the housing. Under the head of the rivet, on the outside of the housing, is a leaf electrode 34 that can be rotated to rest upon the head of an electrode 35. Electrode 35 extends through the housing and is secured to the cradle 32 which supports the stem of the light bulb. To turn the light bulb on, leaf 34 is swung around to rest upon electrode 35. To turn the light off, leaf 34 is moved away from electrode 35.

Illumination is conducted out of the housing by a bundle of optical fibers. The optical fibers are of diverse lengths and are contained within a clear transparent tube 36. Within the tube extends a line having one end pinned to the housing of the lure by a dowel pin 37. Attached to that line are fish hooks 38 and 39 which extend through the wall of tube 36 to expose their barbed ends. The housing 24 has a tongue 24A in which there is a hole that receives a ring 37. The ring 37 provides a convenient means for the attachment of a fishing line. The tongue 24A can be shaped to cause the lure to have a desired motion as it is pulled through the water to better simulate the movement of live bait.

Figure 6:
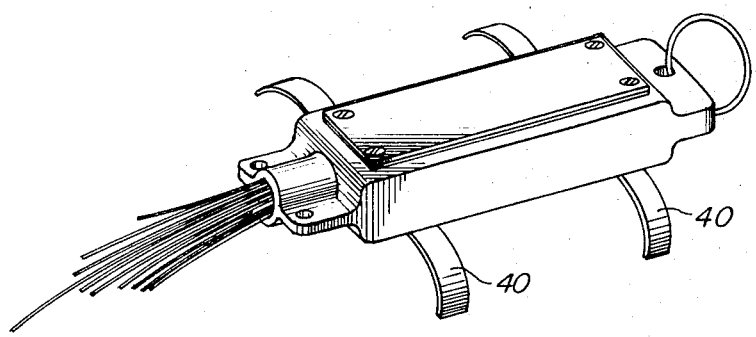
FIG. 6 illustrates an embodiment of the invention intended for attachment to a fish net or other device for catching fish.

A modified form of the FIG. 5 lure is depicted in FIG. 6. This modified lure is intended to be attached to fish nets or other devices for catching fish; therefore, this embodiment need not carry its own fish hooks because its function may be purely that of an attractor to lure the fish to the net or catching device. The housing of FIG. 6 lure is provided with straps 40 to facilitate the tying of the lure to a net. The housing is also provided at each end with tabs having apertures through which rings or other attachment means can extend.

If flashing illumination is wanted instead of steady light, a light bulb of the G.E. type 401 can be employed. That type of bulb has a thermal switch built into its base which causes the lamp to be intermittently turned off and on.

Because the invention can be embodied in varied structures, it is not intended that the invention be limited to the precise forms here illustrated or described. Rather, it is intended that the invention be delimited by the appended claims and include only those structures that utilize the invention.

What I claim is:
1. In a fish lure of the type having
   1. a housing having an enclosed chamber,
   2. an electrical battery situated in the chamber,
   3. a light bulb situated in the chamber,
   4. means for completing an electrical circuit between the battery and the light bulb,
the improvement comprising
   a. a bundle of optical fibers extending through the housing, the interior end of the bundle of optical fibers being mounted in the housing in close proximity to the light bulb, the exterior ends of the optical fibers being separated to present an aspect of a plurality of luminous spots,
   b. an external sleeve having one end secured to the housing,
   c. the portions of the optical fibers outside the housing extending into the sleeve, and the optical fibers being of different lengths whereby their luminous ends present the aspect of a string of luminous spots.

2. The improvement according to claim 1, further comprising
   d. elongate means secured to the housing for the attachment of one of more fish hooks, the elongate means extending into the sleeve and holding the one or more attached fish hooks in close proximity to the sleeve.

3. The improvement according to claim 1, further comprising
   a cradle electrode in the housing, the cradle electrode causing the central electrode of the light bulb to be aligned with the central electrode of the battery, a second electrode in the housing in contact with the other electrode of the battery, a first member mounted on the housing providing an external electrical connection to the cradle electrode, a second member mounted on the housing providing an external electrical connection to the second electrode in the housing, and movable means, for completing an electrical path between the first and second members.

4. In a fish lure of the type having
a. a housing having an enclosed chamber,
2. an electrical battery situated in the chamber,
3. a light bulb situated in the chamber,
4. means for completing an electrical circuit between the battery and the light bulb, the improvement comprising
  a. a bundle of optical fibers extending through the housing, the interior end of the bundle of optical fibers being mounted in the housing in close proximity to the light bulb, the bundle of optical fibers protruding outward from the housing and the protruding portion having fibers of different lengths which present an aspect of a plurality of luminous spots,
  b. elongate means secured to the housing and extending along the bundle of optical fibers,
  c. one or more fish hooks attached to the elongate means, and
  d. means for confining the elongate means in the bundle of optical fibers, the elongate means holding the attached one or more hooks close to the bundle of optical fibers.

* * * * *